(12) United States Patent
Lee

(10) Patent No.: US 11,404,927 B2
(45) Date of Patent: Aug. 2, 2022

(54) STATOR

(71) Applicant: Hyundai Mobis Co., Ltd., Seoul (KR)

(72) Inventor: Jae Min Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 259 days.

(21) Appl. No.: 16/440,057

(22) Filed: Jun. 13, 2019

(65) Prior Publication Data

US 2019/0386533 A1    Dec. 19, 2019

(30) Foreign Application Priority Data

Jun. 14, 2018   (KR) .................. 10-2018-0068149

(51) Int. Cl.
*H02K 3/14* (2006.01)
*H02K 1/16* (2006.01)

(52) U.S. Cl.
CPC ............ *H02K 3/14* (2013.01); *H02K 1/16* (2013.01)

(58) Field of Classification Search
CPC .................................. H02K 3/14; H02K 1/16
See application file for complete search history.

(56) References Cited

U.S. PATENT DOCUMENTS

| | | | | |
|---|---|---|---|---|
| 8,487,498 | B2 * | 7/2013 | Patel ................ | H02K 15/064 310/184 |
| 9,130,431 | B2 * | 9/2015 | Seguchi ............. | H02K 3/28 |
| 9,876,405 | B2 | 1/2018 | Han et al. | |
| 2002/0047449 | A1 * | 4/2002 | Kim ................ | H02K 3/28 310/184 |
| 2013/0193798 | A1 * | 8/2013 | Koga ................ | H02K 3/12 310/208 |
| 2016/0164359 | A1 | 6/2016 | Han et al. | |
| 2016/0172919 | A1 * | 6/2016 | Hattori ............. | H02K 15/02 310/208 |
| 2016/0336826 | A1 * | 11/2016 | Ichikawa ........... | H02K 3/12 |
| 2020/0044507 | A1 * | 2/2020 | Tang ................ | H02K 3/34 |
| 2020/0169149 | A1 * | 5/2020 | Liang ............... | H02K 3/28 |
| 2020/0321819 | A1 * | 10/2020 | Nishikuma ......... | H02K 3/48 |

FOREIGN PATENT DOCUMENTS

KR        20140083730       7/2014
KR     10-2016-0066839      6/2016

OTHER PUBLICATIONS

Office Action dated dated Dec. 22, 2020 from the Korean Intellectual Property Office.

* cited by examiner

*Primary Examiner* — Alexander Talpalatski
(74) *Attorney, Agent, or Firm* — H.C. Park & Associates, PLC

(57) ABSTRACT

The present invention relates to a stator. In a stator winding arrangement structure of a drive motor in which hairpin segments in a shape of a hairpin, each having two legs, are inserted into a stator core having a plurality of slots, and legs of the hairpin segments positioned opposite to the stator core are bent and joined to circuitry-form a serial coil bundle, a stator winding of the drive motor is composed of three or more phases and each of the phases consists of two or more successively adjacent slots. An arrangement structure of hairpin segments mounted in the stator core having a plurality of slots of a hairpin drive motor according to the present invention is modified to form a parallel circuit, and a coil extending over the same outermost layer is removed. In addition, structural stability and production yield of the hairpin segments may be improved.

11 Claims, 6 Drawing Sheets

FIG. 1

| | | SLOT NO. | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| LAYER NO. | 6 | U2+ | U2+ | | | | | U1- | U1- | | | | |
| | 5 | U1+ | U1+ | | | | | U2- | U2- | | | | |
| | 4 | U2+ | U2+ | | | | | U1- | U1- | | | | |
| | 3 | U1+ | U1+ | | | | | U2- | U2- | | | | |
| | 2 | U2+ | U2+ | | | | | U1- | U1- | | | | |
| | 1 | U1+ | U1+ | | | | | U2- | U2- | | | | |

↑ RADIAL DIRECTION

CIRCUMFERENTIAL DIRECTION →     ADJACENT SLOT GROUP

| SLOT NO. | | | | | | | | | | | | | | |
|---|---|---|---|---|---|---|---|---|---|---|---|---|---|---|
| 13 | 14 | 15 | 16 | 17 | 18 | 19 | 20 | 21 | 22 | 23 | 24 | 25 | 26 | 27 |
| U2+ | U2+ | | | | | U1- | U1- | | | | | U2+ | U2+ | |
| U1+ | U1+ | | | | | U2- | U2- | | | | | U1+ | U1+ | |
| U2+ | U2+ | | | | | U1- | U1- | | | | | U2+ | U2+ | |
| U1+ | U1+ | | | | | U2- | U2- | | | | | U1+ | U1+ | |
| U2+ | U2+ | | | | | U1- | U1- | | | | | U2+ | U2+ | |
| U1+ | U1+ | | | | | U2- | U2- | | | | | U1+ | U1+ | |

CIRCUMFERENTIAL DIRECTION →

| SLOT NO. | | | | | | | | | | | | | | |
|---|---|---|---|---|---|---|---|---|---|---|---|---|---|---|
| 28 | 29 | 30 | 31 | 32 | 33 | 34 | 35 | 36 | 37 | 38 | 39 | 40 | 41 | 42 |
| | | | U1- | U1- | | | | | U2+ | U2+ | | | | |
| | | | U2- | U2- | | | | | U1+ | U1+ | | | | |
| | | | U1- | U1- | | | | | U2+ | U2+ | | | | |
| | | | U2- | U2- | | | | | U1+ | U1+ | | | | |
| | | | U1- | U1- | | | | | U2+ | U2+ | | | | |
| | | | U2- | U2- | | | | | U1+ | U1+ | | | | |

CIRCUMFERENTIAL DIRECTION →

| SLOT NO. | | | | | |
|---|---|---|---|---|---|
| 43 | 44 | 45 | 46 | 47 | 48 |
| U1- | U1- | | | | |
| U2- | U2- | | | | |
| U1- | U1- | | | | |
| U2- | U2- | | | | |
| U1- | U1- | | | | |
| U2- | U2- | | | | |

CIRCUMFERENTIAL DIRECTION →

STATOR

CROSS-REFERENCE TO RELATED APPLICATION

This application claims priority from and the benefit of Korean Patent Application No. 2018-0068149, filed on Jun. 14, 2018, which is hereby incorporated by reference for all purposes as if set forth herein.

BACKGROUND

Field

Exemplary embodiments relate to a stator of a driving motor.

Discussion of the Background

Generally, hybrid vehicles or electric vehicles called eco-friendly vehicles may generate a driving torque using an electric motor (hereinafter referred to as a "drive motor") that obtains a rotating force with electrical energy.

The drive motors may be classified into distribution winding drive motors and concentrated winding drive motors depending on a winding scheme of a stator coil. Stators of the distribution winding drive motors may be divided into segment coil stators and ring-shaped wire coil stators according to a type of a coil.

An output of the drive motor is proportional to the number of turns of a coil wound around the stator core. However, if the number of turns of the coil is increased, the size of the stator core or the motor is inevitably increased.

Accordingly, in order to improve the output of the motor without increasing the size of the motor, a method of increasing a space factor of a coil wound around the stator core by minimizing a dead space between the stator core and a winding coil is being considered.

In this regard, in place of using a ring-shaped coil (i.e., "ring-shaped wire") having a circular section as a coil winding, a method of using a flat coil (i.e., "flat wire") having a square section has been actively studied. The flat coil may reduce the dead space and improve the space factor due to a shape of a section as compared with the ring-shaped coil.

However, a coil winding operation of the flat coil is difficult as compared to the ring-shaped coil. Accordingly, methods have been proposed for easily performing the coil winding operation of the flat coil in a segment stator of the distribution winding drive motor, in which a plurality of separated hairpins (i.e., U-shape or V-shape) are inserted and engaged into each slot of the stator core, and in which sequential welds between hairpins disposed in the slot are formed to form a desired electric circuit by continuous connection of the coil in the stator core.

A hairpin winding inserted into each slot of the stator core is basically configured so that two leg portions are inserted into different layers of different slots.

In addition, the hairpin is formed using the wave winding method in which is hairpin segments are inserted into a laminated core, and each leg portion is bent in an outward direction on the opposite side of the laminated core and is welded with a leg portion of another hairpin segment to form a continuous coil.

In this case, in more detail, the wave winding method is a method in which windings are serially connected in a circumferential direction and, when a corresponding layer of a corresponding slot is fully filled, the layer is moved to the next layer to fill the slot. When the last layer is reached, a return coil is disposed over the same layers so that the order of arrangement is reversed in the circumferential direction and a direction of electric current is accordingly reversed.

However, the above-described wave winding method has drawbacks in that since two leg portions constituting the return coil are disposed over the same outermost (or innermost) layer, the support in a radial direct is unstable and tilted and is difficult to fix, and it is difficult to manage a position of an end of the leg at the time of insertion into a twisting jig. Hence, there are difficulties in mass production.

SUMMARY OF THE INVENTION

An objective of the present invention is to provide a stator in which a coil extending over the same outermost layer is removed by modifying an arrangement structure of hairpin segments mounted in a stator core having a plurality of slots.

In one general aspect, there is provided a stator of a drive motor with a stator winding arrangement structure of the drive motor in which hairpin segments in a shape of a hairpin, each having two legs, are inserted into a stator core having a plurality of slots, and legs of the hairpin segments positioned opposite to the stator core are bent and joined to circuitry-form a serial coil bundle, wherein a stator winding of the drive motor is composed of three or more phases and each of the phases consists of two or more successively adjacent slots.

Legs of the serial coil bundle may be consecutively disposed in a layer collinear in a circumferential direction inside adjacent slot groups.

The legs of the series coil bundle may only be disposed in either even number layers or odd number layers in the adjacent slot group.

The number of leg arrangements of the series coil bundle in the adjacent slot groups is configured to be the same as that of other series coil bundles in a parallel relationship.

The number of slots of the adjacent slot group may be configured as a value obtained by dividing a total number of the slots of the stator core by the number of poles and the number of the phases.

Each of the phases of the stator winding of the drive motor may be formed using two or more series coil bundles connected in parallel.

The legs of the hairpin segments positioned in the adjacent slot group may have the same magnitude of a current and the same phase.

The two legs of the hairpin segment may each be inserted into different layers.

The layer may be configured as a plurality of layers.

The layer may be configured as six layers.

A group of hairpin segments consecutively disposed in a first layer and a second layer among the six layers may be classified as a first group, a group of hairpin segments consecutively disposed in a third layer and a fourth layer may be classified as a second group, and a group of hairpin segments consecutively disposed in a fifth layer and a sixth layer may be classified as a third group.

The first group and the second group are connected in series by a connection coil, and the second group and the third group are connected in series by a connection coil.

The connection coil may include any types of conductors that support electrical connection.

The connection coil may be formed to be smaller or larger than one pole pitch.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a diagram showing a stator winding arrangement structure of a drive motor according to the present invention;

DETAILED DESCRIPTION OF THE ILLUSTRATED EMBODIMENTS

Advantages and features of the present invention and methods of achieving the same will be apparent by referring to embodiments described below in detail with reference to the accompanying drawings. However, the present invention is not limited to the embodiments described below and various modifications may be made thereto. The embodiments are merely provided to thoroughly disclose the invention and to convey the category of the invention to one of ordinary skill in the art. The present invention is defined by the appended claims.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
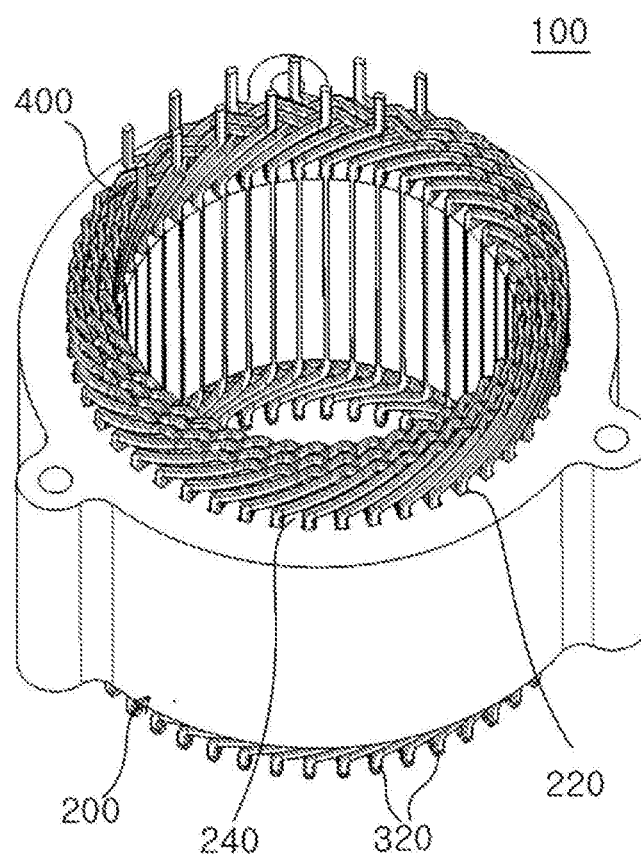
FIGS. 2 and 3 are perspective views showing a stator winding arrangement structure according to an embodiment of the present invention.
Figure 3:
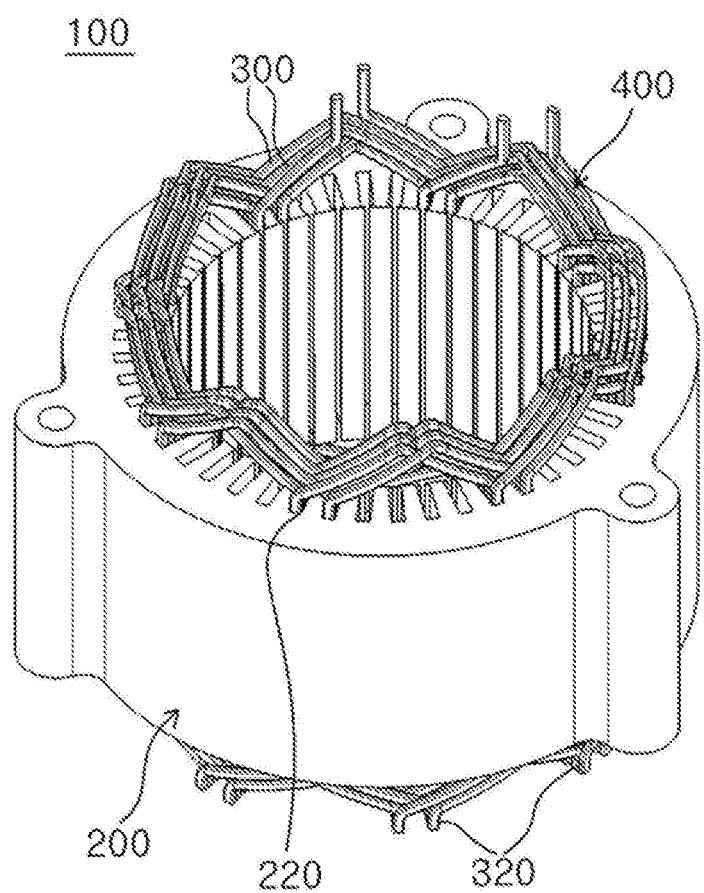
Figure 4:
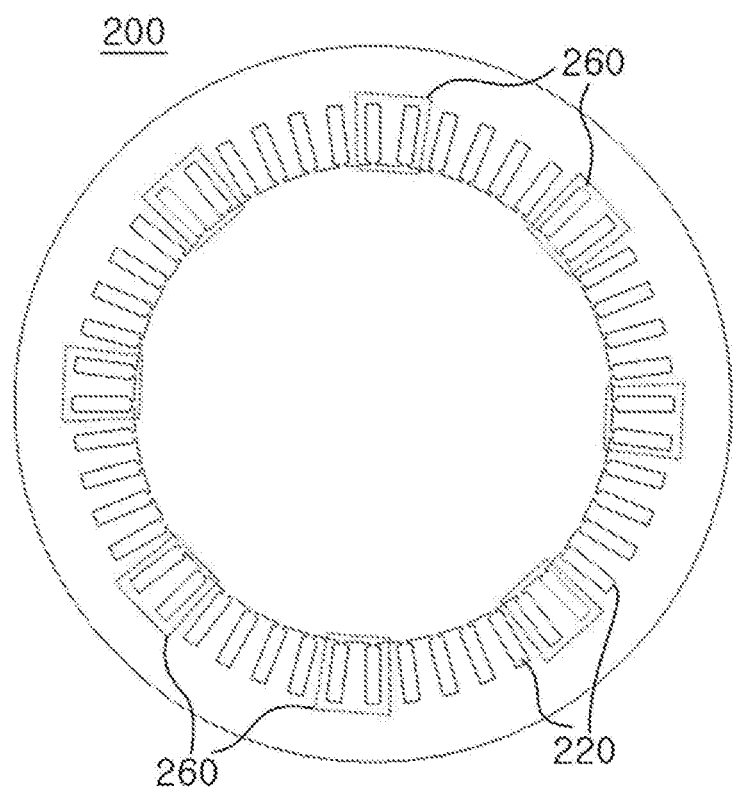
FIG. 4 is a plan view showing an adjacent slot group of a stator according to the present invention.
Figure 5:
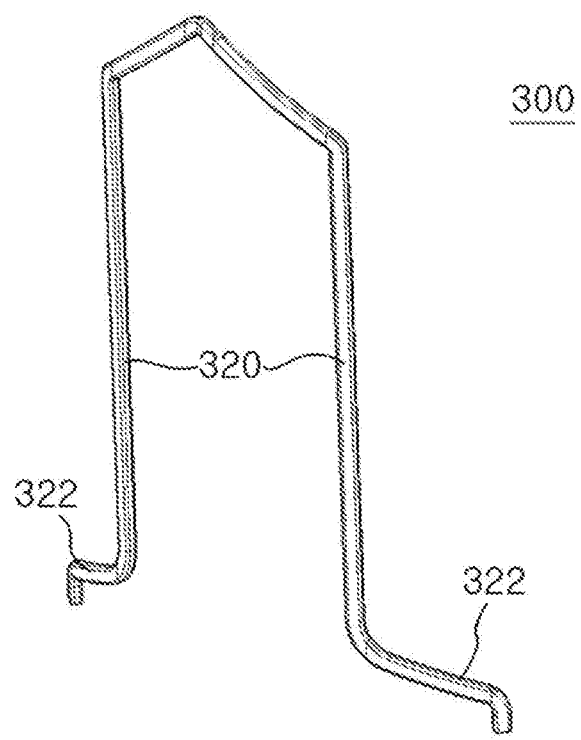
FIG. 5 is a perspective view showing a hairpin segment applied to a winding arrangement structure of a stator according to an embodiment of the present invention.
Figure 6:
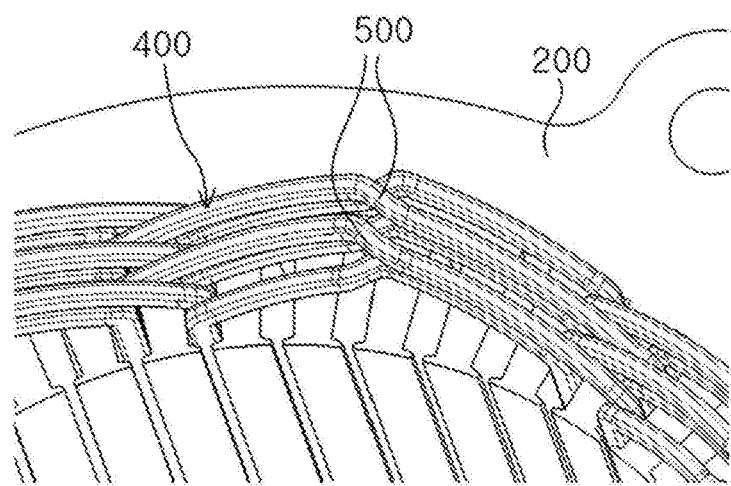
FIG. 6 is a perspective view showing a coupling state of connection coils of a winding arrangement structure of a stator according to the present invention.

Hereinafter, exemplary embodiments of the present invention will be described in detail with reference to the accompanying drawings. FIG. 1 is a diagram showing a stator winding arrangement structure of a drive motor according to the present invention, FIGS. 2 and 3 are perspective views showing a stator winding arrangement structure according to an embodiment of the present invention, FIG. 4 is a plan view showing an adjacent slot group of a stator according to the present invention, FIG. 5 is a perspective view showing a hairpin segment applied to a winding arrangement structure of a stator according to an embodiment of the present invention, and FIG. 6 is a perspective view showing a coupling state of connection coils of a winding arrangement structure of a stator according to the present invention.

A stator 100 according to the present invention is characterized in that an arrangement structure of hairpin segments 300 mounted in the a stator core 200 having a plurality of slots is modified, thereby removing a coil extending over the same outermost layer.

To this end, the stator 100 includes the stator core 200, hairpin segments 300, and the like.

Here, the shapes of the stator core 200 and the hairpin segment 300 are not limited to those shown in the drawings and a known stator core and hairpin segment may be selectively applied.

In addition, in the stator 100, a stator winding of the drive motor is composed of three or more phases and each of the phases is disposed in an adjacent slot group 260 consisting of two or more successively adjacent slots 220 and is formed using two or more series coil bundles connected in parallel.

The stator core 200 is formed in a cylindrical shape.

In addition, a plurality of slots 220 are formed inside the stator core 200 in a circumferential direction and a layer 240 is formed in a direction in which legs 320 of hairpin segment 300 are accommodated in the slots 220.

In other words, the slots 220 and the layers 240 are consecutively formed in the stator core 200 along the circumferential direction of the stator core 200.

In addition, due to the characteristics of a distributed winding scheme, an adjacent slot group 260 in which each of the phases is disposed in two or more successively adjacent slots is formed.

In this case, the number of slots of the adjacent slot group 260 corresponds to a value obtained by dividing the total number of slots of the stator core 200 by the number of poles and the number of phases and each of the phases has the same number of adjacent slot groups 260 as the number of poles.

The hairpin segment 300 is formed in the shape of a hairpin having two legs 320 and is inserted into a slot 220 of the stator core 200.

End portions 322 of the legs 320 passing through the slots 220 of the stator core 200 are bent and joined to circuitry-form a series coil bundle 400.

In addition, the two legs 320 of the hairpin segment 300 are disposed over separate adjacent slot groups 260 that are spaced apart from each other.

That is, when one of the two legs 320 of the hairpin segment 300 is positioned in the second layer of the first adjacent slot group 260, the other leg 320 may be positioned in the first layer of the second adjacent slot group 260.

In more detail, when all of the adjacent slot groups 260 allocated to each of the phases are filled with the plurality of hairpin segments 300, two legs 320 of the hairpin segment 300 are generally arranged at an interval of one pole pitch, which means the same slot positions in the two adjacent slot groups 250.

Then, legs 320 of the series coil bundle 400 formed by connecting the hairpin segments 300 are consecutively disposed in layers which are collinear in the circumferential direction inside the adjacent slot groups 260.

In this case, the legs 320 of the hairpin segments 300 positioned in the adjacent slot group 260 are formed to have the same magnitude of electric current and the same phase, and the number of spaces for arranging legs of the series coil bundle 400 inside the adjacent slot group 260 is configured to be the same as that of the other series coil bundles in a parallel relationship.

In addition, the same phase of an electric circuit is formed using two or more series coil bundles 400 connected in parallel. According to the present invention, the number of slots of the adjacent slot group 260 and the number of parallel connections on the electric circuit are two or more.

Then, two legs of the hairpin segment 300 that form the series coil bundle 400 may each be inserted into different layers.

The layer is configured as a plurality of layers.

In the present invention, a description will be given of a configuration of six layers for convenience of description.

A group of hairpin segments which are consecutively disposed in a pair of adjacent layers among the plurality of layers, i.e., six layers, to form a series circuit is classified as a first group, a group of hairpin segments which are consecutively disposed in a pair of adjacent layers next to the first group to form a series circuit is classified as a second group, and a group of hairpin segments which are consecutively disposed in a pair of adjacent layers next to the second group to form a series circuit is classified as a third group.

In this case, the first group and the second group are connected in series by a connection coil 500, and the second group and the third group are connected in series by a connection coil 500.

Specifically, when one of the two legs 320 of the hairpin segment 300 belongs to the first group in the first adjacent slot group 260, the other leg 320 is positioned in the second group in the second adjacent slot group 260.

In addition, the connection coil 500 has to move to another slot 220 in the adjacent slot group 260, and to this end, a special hairpin segment larger or smaller than one pole pitch is used.

In more detail, in the existing winding arrangement structure disposed in the same outermost layer, in terms of the order of filling slots and layers in the same adjacent slot group, layers are first filled and then the slot is moved to another slot so that connection coils are disposed in the same outermost layer. Therefore, by modifying the structure in such a manner that slots of the same layer in the adjacent slot group are filled first and the layer is changed, it is possible to dispose the connection coils in an inner layer, thereby removing a coil at the outermost layer which is a problem of the existing structure.

Meanwhile, the layers are not limited to the layers shown in FIG. 1, and at least six layers may be formed according to an environment and purpose, and four to ten layers may be formed.

In the stator according to the present invention, a coil extending over the same outermost layer is removed by modifying an arrangement structure of hairpin segments mounted in the stator core having a plurality of slots of a drive motor so that structural stability and production yield of the hairpin segments may be improved.

The foregoing description of the invention is for illustrative purposes, and a person having ordinary skilled in the art should appreciate that other specific modifications can be easily made thereto without departing from the technical spirit or essential features of the invention.

Therefore, the foregoing embodiments should be regarded as illustrative rather than limiting in all aspects and do not limit the scope of the present invention. The scope of the invention should be defined by the appended claims, and all technical ideas within the scope of their equivalents should be construed as being included in the scope of the invention.

What is claimed is:

1. A stator with a stator winding arrangement structure of a drive motor in which hairpin segments in a shape of a hairpin, each having two legs and a first pitch of one pole, are inserted into a stator core having a plurality of slots, and legs of the hairpin segments positioned opposite to the stator core are bent and joined to form a serial coil bundle,
wherein the stator winding arrangement structure of the drive motor is composed of three or more phases and each of the phases consists of two or more successively adjacent slots,
wherein the stator winding arrangement structure has at least six layers,
wherein, for each phase of the stator winding, a group of hairpin segments consecutively disposed in a first layer and a second layer among the at least six layers is classified as a first group, a group of hairpin segments consecutively disposed in a third layer and a fourth layer is classified as a second group, and a group of hairpin segments consecutively disposed in a fifth layer and a sixth layer is classified as a third group, and
wherein the first group of hairpin segments and the second group of hairpin segments are connected in series by a connection coil comprising a special hairpin segment having a second pitch one slot larger or smaller than one pole, and the second group of hairpin segments and the third group of hairpin segments are connected in series by a connection coil comprising another special hairpin segment having the second pitch one slot larger or smaller than one pole.

2. The stator of claim 1, wherein legs of the serial coil bundle are consecutively disposed in at least one layer collinear in a circumferential direction inside adjacent slot groups.

3. The stator of claim 2, wherein the legs of the series coil bundle are only disposed in either even number layers or odd number layers in the adjacent slot group.

4. The stator of claim 3, wherein the number of leg arrangements of the series coil bundle in the adjacent slot groups is configured to be the same as that of other series coil bundles in a parallel relationship.

5. The stator of claim 1, wherein a number of slots of an adjacent slot group is obtained by dividing a total number of the slots of the stator core by the number of poles and the number of the phases.

6. The stator of claim 1, wherein each of the phases of the stator winding arrangement structure of the drive motor is formed using two or more series coil bundles connected in parallel.

7. The stator of claim 1, wherein the legs of the hairpin segments positioned in an adjacent slot group have the same magnitude of a current and the same phase.

8. The stator of claim 2, wherein the two legs of the hairpin segment are each inserted into different layers.

9. The stator of claim 2, wherein the at least one layer is configured as a plurality of layers.

10. The stator of claim 9, wherein the at least one layer is configured as six layers.

11. The stator of claim 1, wherein the connection coil includes any types of conductors that support electrical connection.

* * * * *